(12) United States Patent
Huang (10) Patent No.: US 7,068,448 B2
(45) Date of Patent: Jun. 27, 2006

(54) OPTICAL LENS AND LENS SYSTEM (75) Inventor: Hsin-Chieh Huang, Taoyuan County (TW)

(73) Assignee: Axon Technologies Corp., Taoyuan County (TW)

( * ) Notice: Subject to any disclaimer, the term of this patent is extended or adjusted under 35 U.S.C. 154(b) by 0 days.

(21) Appl. No.: 10/710,598

(22) Filed: Jul. 23, 2004

(65) Prior Publication Data
US 2006/0018036 A1 Jan. 26, 2006

(51) Int. Cl.
*G02B 7/02* (2006.01)
*G02B 15/14* (2006.01)

(52) U.S. Cl. .................. 359/819; 359/822; 359/694

(58) Field of Classification Search ........ 359/694–704, 359/819, 821–823
See application file for complete search history.

(56) References Cited

U.S. PATENT DOCUMENTS

| | | | | |
|---|---|---|---|---|
| 4,662,717 A | * | 5/1987 | Yamada et al. | 359/362 |
| 5,231,473 A | * | 7/1993 | Kawamura et al. | 359/694 |
| 5,898,527 A | * | 4/1999 | Sawai et al. | 359/819 |
| 6,597,518 B1 | * | 7/2003 | Nomura et al. | 359/699 |
| 6,741,406 B1 | * | 5/2004 | Kitamura et al. | 359/819 |
| 6,954,311 B1 | * | 10/2005 | Amanai | 359/621 |

* cited by examiner

*Primary Examiner*—Ricky Mack
*Assistant Examiner*—M. Hasan
(74) *Attorney, Agent, or Firm*—Jianq Chyun IP Office (57) ABSTRACT A lens system including a first lens and a second lens is provided. The first lens has a first outer loop and at least a protrusiondisposed on the first outer loop of the first lens. In addition, the second lens is lodged to the first lens. The second lens has a second outer loop and at least a recess disposed on the second outer loop of the second lens. The first outer loop is leant to the second outer loop, and the protrusion is lodged to the recess. Accordingly, the first lens and the second lens have an excellent alignment precision.

18 Claims, 10 Drawing Sheets

OPTICAL LENS AND LENS SYSTEM

BACKGROUND OF INVENTION

1. Field of the Invention

The present invention generally relates to a lens. More particularly, the present invention relates to an optical lens and a lens system.

2. Description of the Related Art

In a variety of equipments such as telescope, camera, microscope or optical projection system, the optical system is an important component. Generally, in the optical system described above, the image quality is highly dependent on the lens thereof. Hereinafter, the structure of a conventional lens will be discussed in detail.

Figure 1:
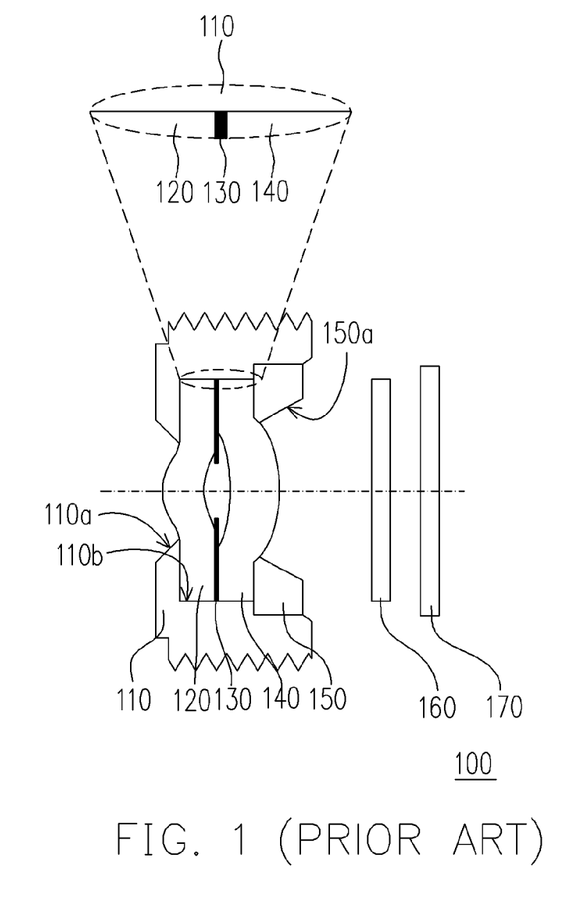
FIG. 1 is a schematic cross-sectional view illustrating a conventional lens.

FIG. 1 is a schematic cross-sectional view illustrating a conventional lens. Referring to FIG. 1, the conventional lens 100 includes a barrel 110, a first lens 120, a baffle 130, a second lens 140, a mount 150, a filter 160 and a charge coupled device (CCD) sensor 170. The barrel 110 has a light incidence opening 110a for incidence of light and a receiving space 110b, wherein the first lens 120, the baffle 130, the second lens 140 and the mount 150 are disposed in the receiving space 110b sequentially. The baffle 130 is disposed between the first lens 120 and the second lens 140b. In addition, a portion of first lens 120 is exposed by the light incidence opening 110a. The mount 150 has a light exit opening 150a for the exit of light, wherein a portion of the second lens 140 is exposed by the light exit opening 150a. Moreover, the CCD sensor 170 is disposed on a light path after the mount 150, and the filter 160 is disposed on the light path between the mount 150 and the CCD sensor 170.

Therefore, the image quality of the conventional lens 100 is dependent on the precision of the alignment of the first lens 120 and the second lens 140. It is preferable that the optical axis of the first lens 120 and the optical axis of the second lens 140 should be coincident. However, in fact that the optical axis of the first lens 120 and the optical axis of the second lens 140 are not coincident, and thus the optical property of the conventional lens 100 is dependent on the alignment error. Referring to the enlarged view shown in FIG. 1, in the conventional lens 100, the alignment of the first lens 120 and the second lens 140 is dependent on the assembly of the first lens 120 and the second lens 140 with the inner wall of the barrel 110. Therefore, the alignment precision of the first lens 120 and the second lens 140 is influenced by the machining precision of the inner wall of the barrel 110. Recently, the machining of the barrel 110 is performed by using the computer numerical control (CNC) lathe or the CNC boring machine. However, generally the finest machining precision of the inner wall of the barrel 110 is up to about 10 μm. Therefore, the alignment error of the first lens 120 and the second lens 140 is greater than 5 μm, and thus the application of the conventional lens 100 using the barrel 110 for alignment is limited. Specially, the conventional lens 100 using the barrel 110 for alignment is not suitable for an optical instrument requiring high precision. Furthermore, the optical property of the conventional lens 100 will be analyzed by using optical simulation analysis described in the following.

Figure 2:
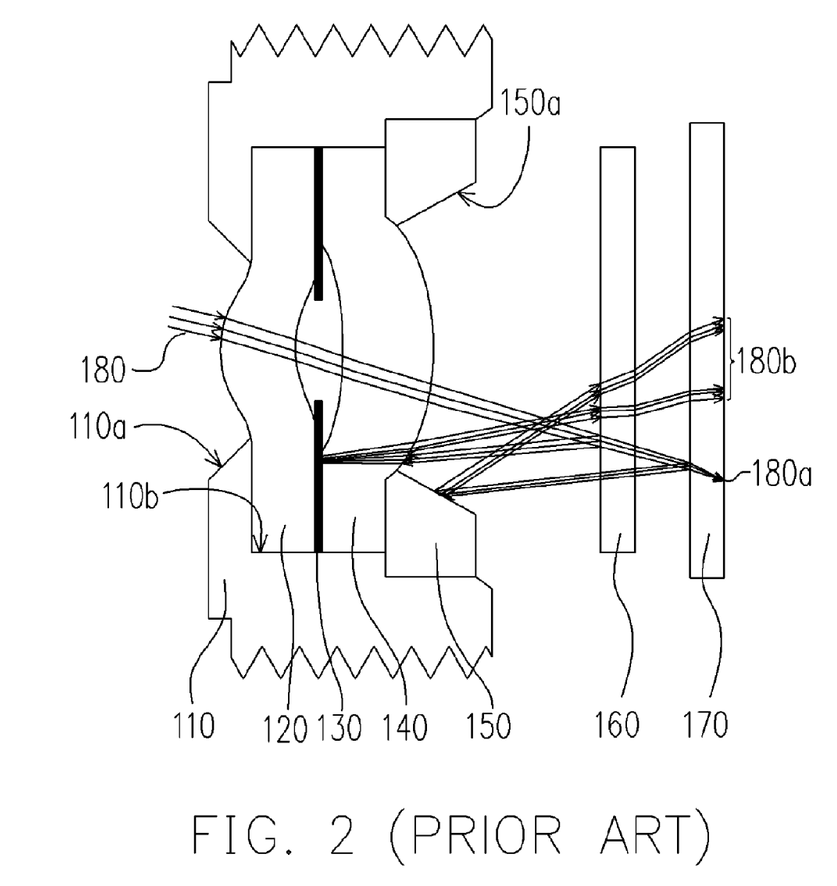
FIG. 2 is a schematic drawing of the optical simulation analysis of a conventional lens.

FIG. 2 is a schematic drawing of the optical simulation analysis of a conventional lens. Referring to FIG. 2, a light 180 is incident onto the CCD170 via the light incidence opening 110a of the barrel 110, the first lens 120, the opening 130a of the baffle 130, the second lens 140, the light exit opening 150a of the mount 150 and the filter 160. A portion of the light 180 forms the image light source 180a and another portion of the light 180 forms an useless stray light 180b, wherein the image quality is influenced by the stray light 180b. It is noted that, a portion of the stray light 180b is formed by the reflected light of the light 180 via the filter 160, and via the interface between the first lens 120 and the second lens 140. In addition, another portion of the stray light 180b is formed by the reflected light of the light 180 via the CCD sensor 170, and via the surface of the mount 150. Although the baffle 130 disposed between the first lens 120 and the second lens 140 is composed of a black and low reflectivity material for absorbing the stray light 180b, the improvement of the baffle 130 is not obvious.

SUMMARY OF INVENTION

Accordingly, the present invention is directed to an optical lens, wherein the alignment precision of the assembly of the lenses is enhanced, and the influence of the stray light is also improved.

In addition, the present invention is also directed to a lens system, wherein the alignment error of the assembly of the lenses is enhanced.

In accordance with one embodiment of the present invention, an optical lens comprising, for example but not limited to, a barrel, a first lens and a second lens is provided. The barrel includes, for example but not limited to, a light incidence opening and a receiving space, wherein the receiving space and the light incidence opening are connected. The first lens is disposed in the receiving space, and the first lens includes, for example but not limited to, a first outer loop and at least a protrusion disposed on the first outer loop, wherein a portion of the first lens is exposed by the light incidence opening. Moreover, the second lens is disposed in the receiving space and lodged to the first lens. The second lens includes, for example but not limited to, a second outer loop and at least a recess disposed on the second outer loop, wherein the first outer loop is leant to the second outer loop, and the protrusion is lodged to the recess.

In one embodiment of the present invention, the protrusion includes, for example, a hemispheric protrusion and the recess includes, for example, a hemispheric recess, wherein the hemispheric protrusion is lodged to the hemispheric recess. In another embodiment of the present invention, the protrusion includes, for example, an annular protrusion and the recess includes, for example, an annular recess, wherein the annular protrusion is lodged to the annular recess.

In one embodiment of the present invention, the optical lens further comprises, for example but not limited to, a baffle disposed between the first lens and the second lens.

In one embodiment of the present invention, the optical lens further comprises, for example but not limited to, a mount disposed in the receiving space and leant to the second lens, wherein a portion of second lens is exposed by a light exit opening of the mount.

In one embodiment of the present invention, the optical lens further comprises, for example but not limited to, an image capture component disposed on a light path after the mount.

In one embodiment of the present invention, the optical lens further comprises, for example but not limited to, a filter disposed on a light path between the mount and the image capture component.

In accordance with another embodiment of the present invention, a lens system including, for example but not limited to, a first lens and a second lens are provided. The first lens includes, for example but not limited to, a first outer loop and at least a protrusion disposed on the first outer loop on. In addition, the second lens is lodged to the first lens. The second lens includes a second outer loop and at least a recess disposed on the second outer loop. The first outer loop is leant to the second outer loop, and the protrusion is lodged to the recess.

In one embodiment of the present invention, the protrusion includes, for example, a hemispheric protrusion and the recess includes, for example, a hemispheric recess, wherein the hemispheric protrusion is lodged to the hemispheric recess.

In one embodiment of the present invention, the protrusion comprises, for example, an annular protrusion, and the recess include, for example, an annular recess, wherein the annular protrusion is lodged to the annular recess.

Accordingly, in the lens system of the present invention, the first lens and the second lens are assembled by the lodging of the protrusion and the recess. Therefore, the alignment precision and the assembly precision of the lens system of the present invention are improved. In addition, in the optical lens of the present invention, the lenses are assembled by the lodging of the protrusion and the recess, thus the alignment error of the lenses is reduced. Therefore, the optical lens of the present invention has an excellent optical property.

One or part or all of these and other features and advantages of the present invention will become readily apparent to those skilled in this art from the following description wherein there is shown and described a preferred embodiment of this invention, simply by way of illustration of one of the modes best suited to carry out the invention. As it will be realized, the invention is capable of different embodiments, and its several details are capable of modifications in various, obvious aspects all without departing from the invention. Accordingly, the drawings and descriptions will be regarded as illustrative in nature and not as restrictive.

BRIEF DESCRIPTION OF DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DETAILED DESCRIPTION

The present invention will be described fully hereinafter with reference to the accompanying drawings, in which preferred embodiments of the present invention are illustrated. The present invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements in the accompanying drawings throughout.

Figure 3A:
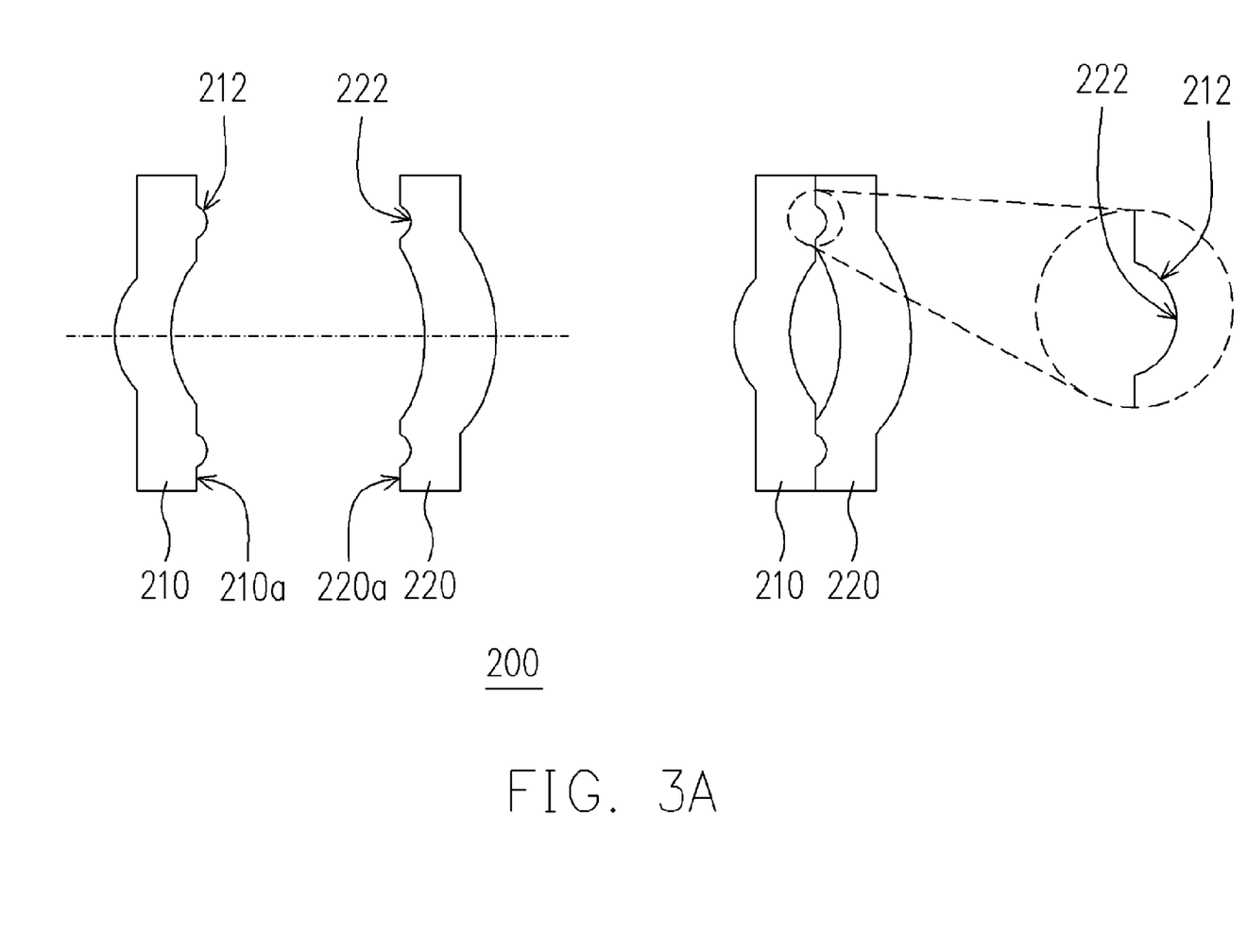
FIG. 3A is a schematic cross-sectional view illustrating a lens system according to one embodiment of the present invention.

FIG. 3A is a schematic cross-sectional view illustrating a lens system according to one embodiment of the present invention. Referring to FIG. 3A, the lens system 200 comprises, for example but not limited to, a lens 210 and a lens 220. The lens 210 comprises, for example, an outer loop 210a and at least one protrusion 212, wherein the protrusion 212 is disposed on the outer loop 210a. In addition, the lens 220 is lodged to the lens 210. The lens 220 comprises, for example, an outer loop 220a and at least one recess 222, wherein the recess 222 is disposed on the outer loop 220a. The outer loop 210a is leant on the outer loop 220a, and the protrusion 212 is lodged to the recess 222 (as shown in the enlarged view of FIG. 3A).

Figure 3B:
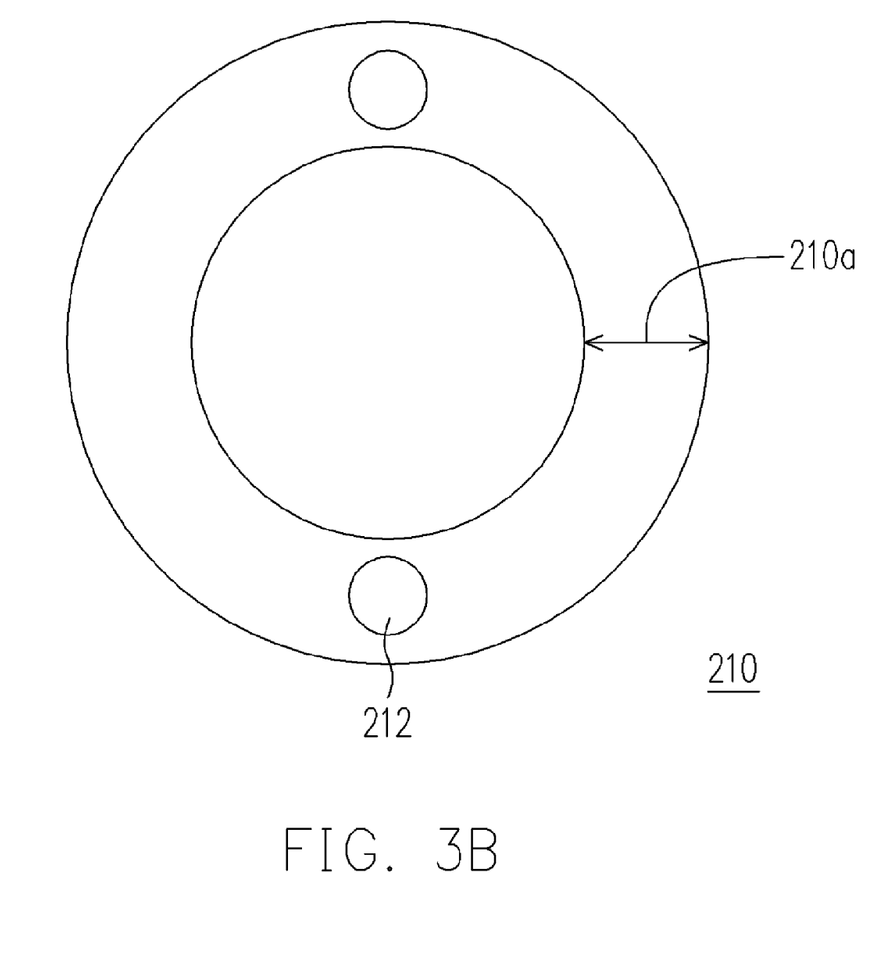
FIG. 3B is a front view illustrating a lens 210 according to one embodiment of the present invention.

FIG. 3B is a front view illustrates a lens according to one embodiment of the present invention. Referring to FIG. 3A and FIG. 3B, materials of the lens 210 and the lens 220 may comprises, for example, a transparent glass, a transparent plastic or other transparent material. In addition, the protrusion 212 of the first lens 210 comprises, for example, a hemispheric protrusion, and the protrusion 212 is disposed on the first outer loop 210a. The protrusion 212 may be disposed as shown in FIG. 3B. The recess 222 of the second lens 220 comprises, for example, a hemispheric recess. It is noted that each hemispheric protrusion is lodged to a corresponding hemispheric recess. Moreover, the machining of the first lens 210 and the second lens 220 may be performed by, for example, using diamond grinding machine. Therefore, the shape precision of the protrusion 212 of the lens 210 and the recess 222 of the lens 220 are less than about 0.2 μm.

Referring to FIG. 3B, since the shape precision of the protrusion 212 of the lens 210 and the recess 222 of the lens 220 are less than about 0.2 μm, the alignment error of the assembly of the lens 210 and the lens 220 is extremely small. Therefore, the eccentric shifting of the optical axis of the lens system 200 of the present invention is effectively improved in comparison with the conventional lens system. Furthermore, in comparison with the conventional lens assembled by a barrel, the lens system 200 of the present invention has a smaller optical error such as eccentric error, heeling error, and a greater perpendicularity between optical axis and lens. Therefore, the lens system 200 may be applied to a variety of optical instruments requiring high precision such as a laser apparatus, a microscope, a telescope and a snooper scope.

Figure 3C:
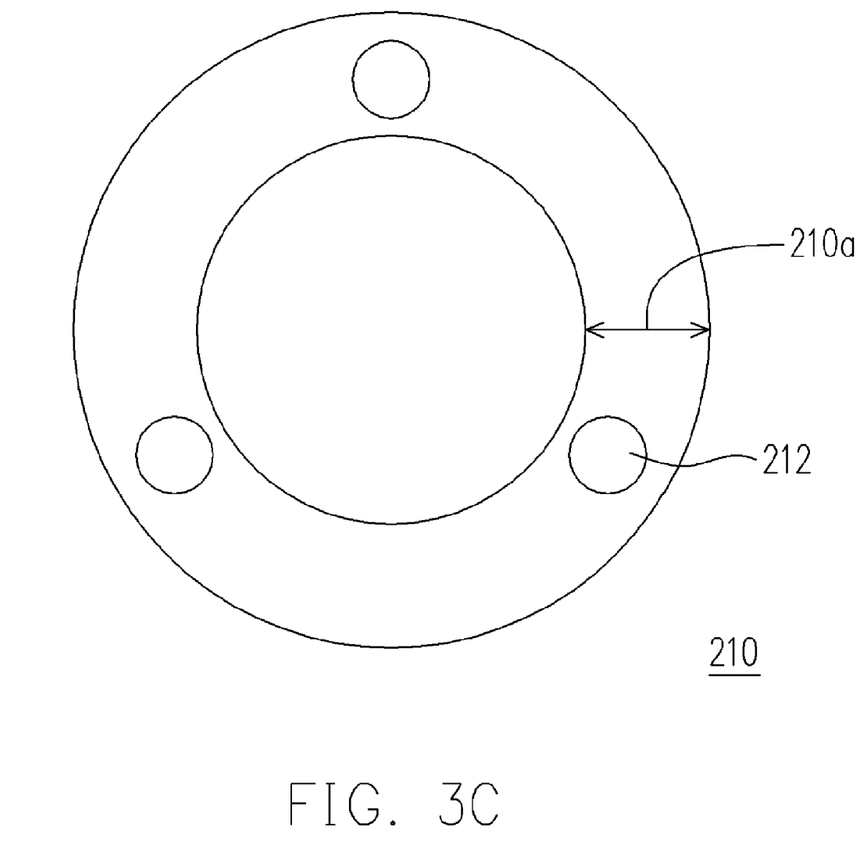
FIG. 3C illustrates a distribution of protrusions according to one embodiment of the present invention.

FIG. 3C illustrates another distribution of protrusions according to one embodiment of the present invention. Referring to FIG. 3C, there are three protrusions 212 of the lens system 200. Therefore, in comparison with FIG. 3B, the precision of the assembly of the lens 210 and the lens 220 of FIG. 3C is enhanced. It is noted that, the distribution and the position of the protrusion 212 of the lens system 200 of the present invention is not limited to the embodiments and the drawings such as FIG. 3B and FIG. 3C of the present invention. In the invention, any distribution of the protrusion 212 with any number of protrusions may be performed to enhance the precision and the convenience of the assembly of the lens 210 and the lens 220.

Figure 4A:
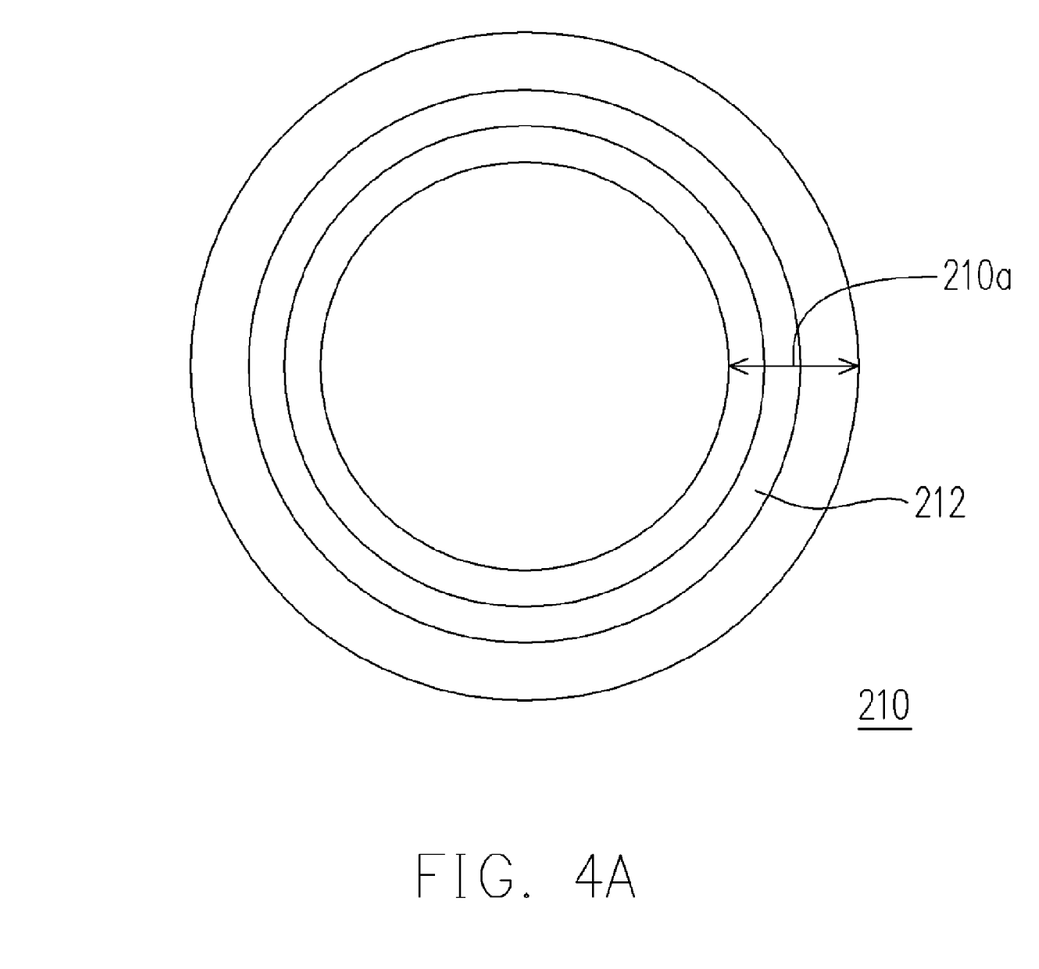
FIG. 4A is a front view illustrates a first lens according to one embodiment of the present invention.

FIG. 4A is a front view illustrates a first lens according to one embodiment of the present invention. It is noted that, referring to FIG. 3A, the protrusion 212 comprises a hemispheric protrusion and the recess 222 comprises a hemispheric recess as shown in FIG. 3A, FIG. 3B and FIG. 3C. However, referring to FIG. 4A, the protrusion 212 comprises an annular protrusion and the recess 222 comprises an annular recess.

Figure 4B:
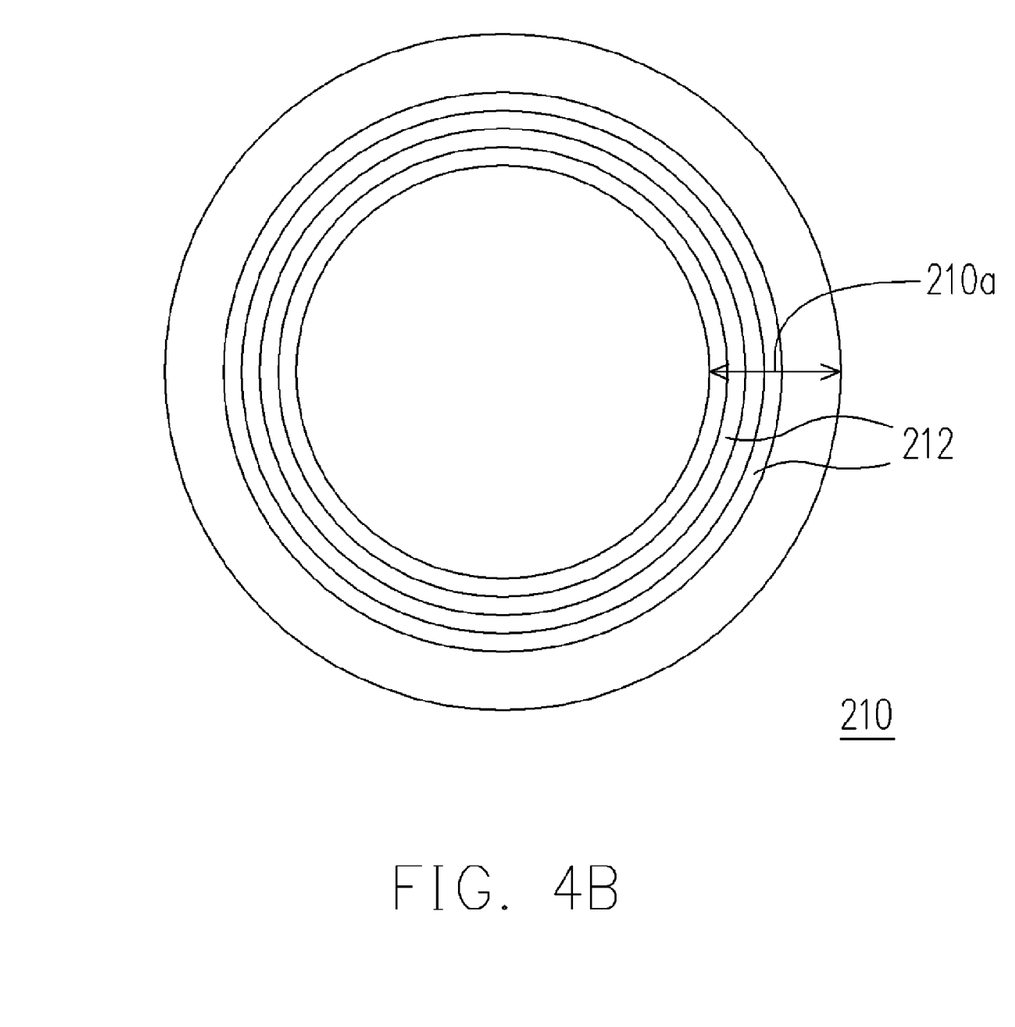
FIG. 4B illustrates a distribution of protrusions according to one embodiment of the present invention.

FIG. 4B illustrates a distribution of protrusions according to one embodiment of the present invention. It is noted that, referring to FIG. 4A, the protrusion 212 comprises only one single annular protrusion, however, referring to FIG. 4B, the protrusion 212 comprises a plurality of annular protrusions. In the present invention, the annular protrusion may comprise any distribution density, width and number of protrusions.

Accordingly, in the lens system 200 of the present invention, the lodging between the lenses is not limited to the method of using the hemispheric protrusion and the hemispheric recess, or using the annular protrusion and the annular recess. In fact, the scope of the present invention comprises any method of lodging the lens 210 to the lens 220 of the lens system 200. In addition, the lens system 200 of the present invention is not limited to the assembly of the lens 210 and the lens 220. In fact, the scope of the present invention comprises an assembly of any number of lenses. Moreover, the lens system 200 of the present invention may be applied to a variety of optical instruments to enhance the image quality of the optical instrument. Furthermore, the application of the lens system 200 of the present invention to the optical lens will be described hereinafter; however, the description can not be used to limit the scope of the application of the lens system 200 of the present invention.

Figure 5A:
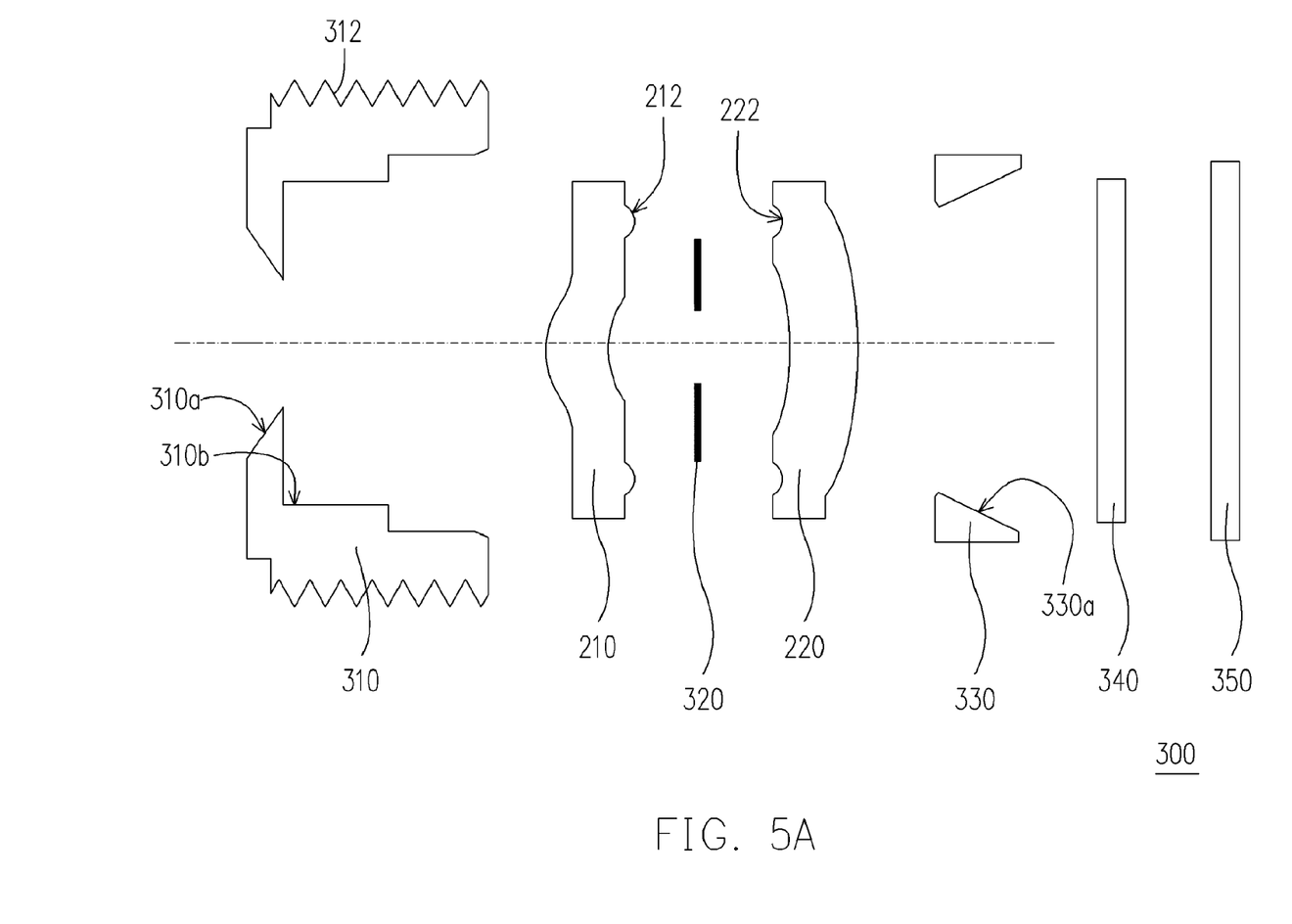
FIG. 5A is an explosive cross-sectional view illustrating an optical lens according to one embodiment of the present invention.
Figure 5B:
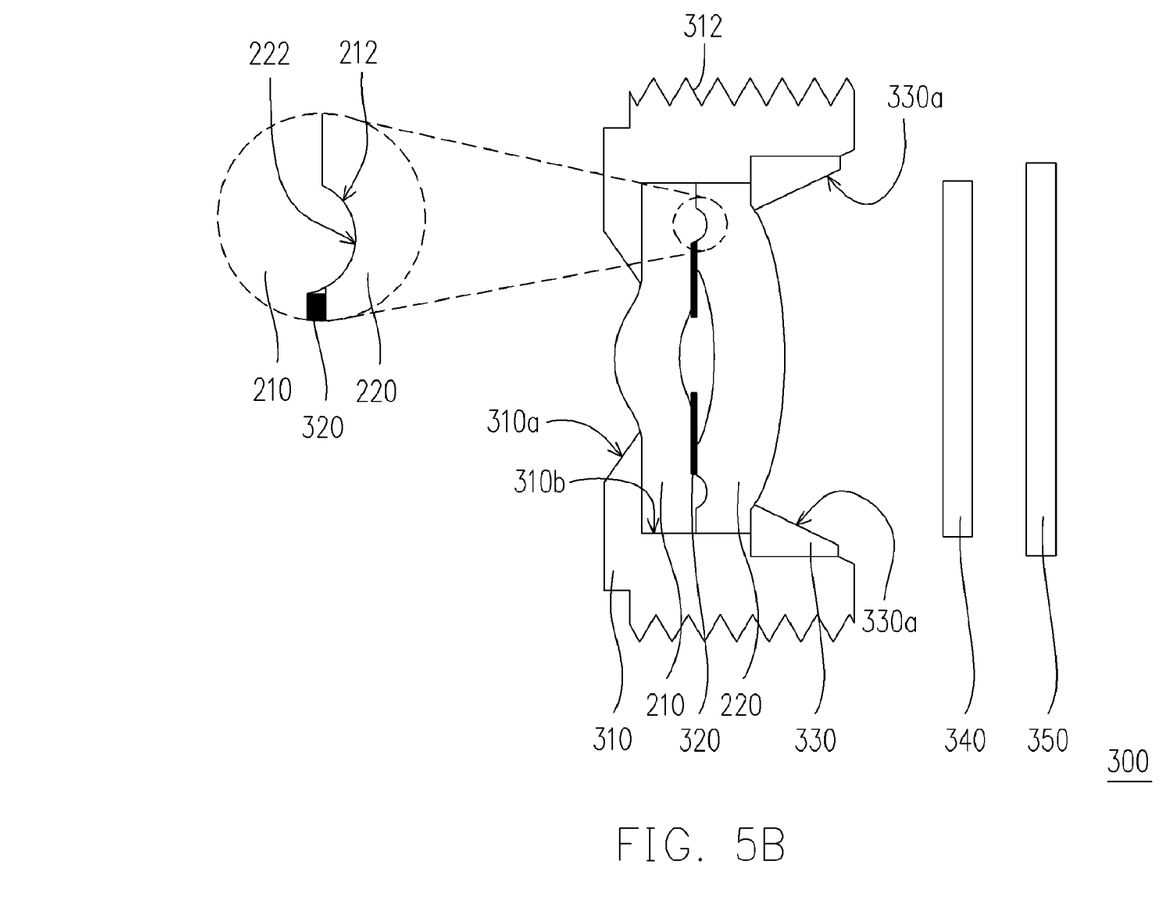
FIG. 5B is a combinative cross-sectional view illustrating an optical lens according to one embodiment of the present invention.

FIG. 5A is an explosive cross-sectional view illustrating an optical lens according to one embodiment of the present invention. FIG. 5B is a combinative cross-sectional view illustrating an optical lens according to one embodiment of the present invention. Referring to FIG. 5A and FIG. 5B, an optical lens 300 comprises, for example but not limited to, a barrel 310, a lens 210, a lens 220, a baffle 320, a mount 330, a filter 340 and an image capture component 350. The barrel 310 comprises, for example, a light incidence opening 310a and a receiving space 310b, wherein the receiving space 310b is connected with the light incidence opening 310a. In addition, the lens 210 is disposed in the receiving space 310b, and a portion of lens 210 is exposed by the light incidence opening 310a as shown in FIG. 5B. Moreover, the lens 220 is disposed in the receiving space 310b and lodged to the first lens 210, wherein the recess 222 of the second lens 220 is lodged to the protrusion 212 of the first lens 210 as the enlarged view shown in FIG. 5B. It is noted that, the shape, distribution and the amount of the protrusion 212 and the recess 222 of FIG. 5A and FIG. 5B may be similar to that of the protrusion 212 and the recess 222 shown in FIG. 3B, FIG. 3C, FIG. 4A or FIG. 4B. However, the shape, distribution and the amount of the protrusion 212 and the recess 222 of FIG. 5A and FIG. 5B may not be limited by the embodiments of the present invention.

Referring to FIG. 5B, the baffle 320 is disposed between the lens 210 and the lens 220. In addition, the mount 330 is disposed in the receiving space 310b and leant on the second lens 220. The mount 330 comprises, for example, a light exit opening 330a for exposing a portion of lens 220. Moreover, the image capture component 350 is disposed on a light path after the mount 330. Furthermore, the filter 340 is disposed on a light path between the mount 330 and the image capture component 350. It is noted that, the baffle 320, the mount 330, the filter 340 and the image capture component 350 are optional.

Moreover, a material of the baffle 320 comprises, for example but not limited to, a low reflectivity material. The low reflectivity material comprises, for example but not limited to, black polymer for reducing the influence of the reflected stray light. In addition, the filter 340 comprises, for example but not limited to, infrared light filter (IR filter) or other filter. Moreover, the image capture component 350 comprises, for example but not limited to, charge coupled device (CCD) sensor, complementary metal oxide semiconductor (MOS) image sensor or other image capture component. In order to enhance the convenience of assembling the optical lens 300, the barrel 310 may further comprise, for example but not limited to, a screw thread 312 disposed on the outer surface of the barrel 310. However, the screw thread 312 of the barrel 310 is also optional. Furthermore, the optical property of the optical lens 300 of the present invention will be described according to the optical simulation analysis thereof.

Figure 6:
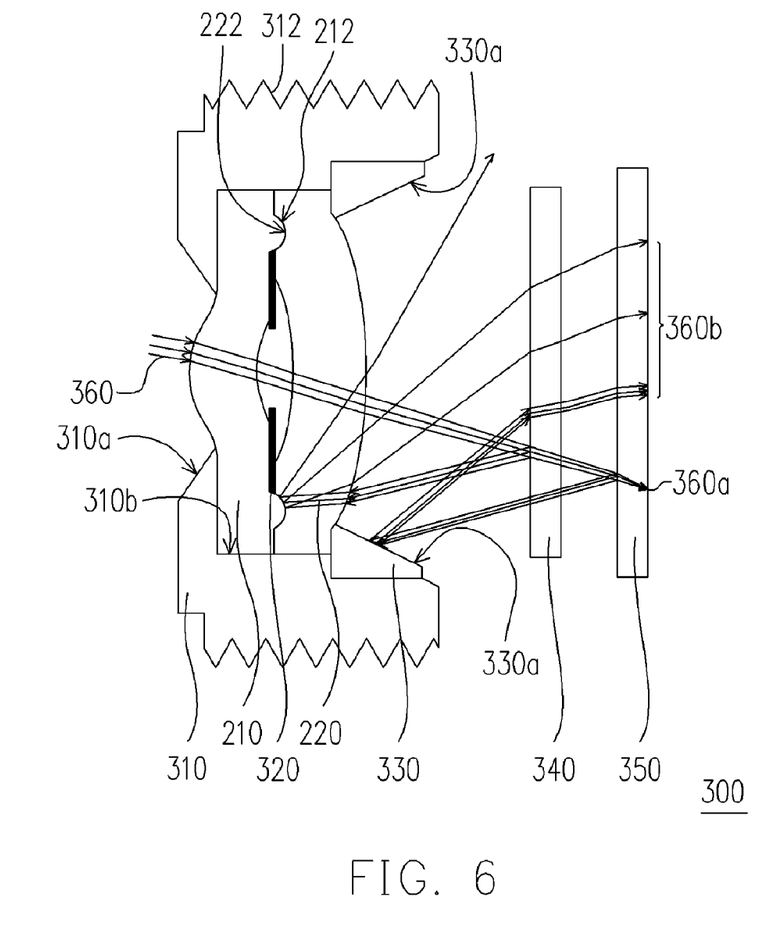
FIG. 6 is a schematic drawing of the optical simulation analysis of an optical lens according to one embodiment of the present invention.

FIG. 6 is a schematic drawing of the optical simulation analysis of an optical lens according to one embodiment of the present invention. Referring to FIG. 6, a light 360 is incident onto the image capture component 350 via the light incidence opening 310a of the barrel 310, the first lens 210, the baffle 320, the second lens 220, the light exit opening 330a of the mount 330 and the filter 340. A portion of the light 360 forms an image light source 360a, and another portion of the light 360 forms an useless stray light 360b. It is noted that, when a portion of the light 360 is exited from the surface of the filter 340 and incident onto the interface between the first lens 210 and the second lens 220, the curve structure of the protrusion 212 and the recess 222 will scatter a portion of the reflected light 360 to reduce the stray light 360b. In comparison with conventional lens 100 shown in FIG. 2, a portion of reflected light 360 is scattered by the structure of the protrusion 212 and the recess 222 of the optical lens 300 of the present invention shown in FIG. 6. Therefore, the amount of the stray light 360b is reduced effectively and the image quality is enhanced. It is noted that, in the present invention, the protrusion 212 is not necessary to be disposed on the first lens 210, and the recess 222 is not necessary to be disposed on the second lens 220. Alternatively, the recess 222 may be disposed on the first lens (not shown), and the protrusion may be disposed on the second lens (not shown), and thus the alignment precision of the assembly of the first lens 210 and the second lens 220 may also be enhanced.

In summary, in the present invention, not only the alignment precision of the assembly of the first lens 210 and the second lens 220 is enhanced by the protrusion 212 and the recess 222, but also the influence of the stray light 360b of the optical lens 300 is reduced. Therefore, the image quality is further improved. In addition, the distribution, the position, the amount and the curvature of the protrusion 212 and the recess 222 may be optimized by the optical simulation analysis. Thus, the alignment precision of the assembly of the lens 210 and the lens 220 is enhanced and the image quality of the optical lens 300 is improved.

Accordingly, the optical lens and the lens system of the present invention has at least following advantages. First, in the conventional optical system, the assembly of the lenses is performed by using the barrel, wherein the machining precision of the inner wall of the barrel is about 10 μm. However, in the optical lens and the lens system of the present invention, the assembly of the lenses is performed by the lodging of the protrusion and the recess 222 wherein the machining precision of the protrusion and the recess 222 is about 0.2 μm. Therefore, the alignment precision of the optical lens and the lens system of the present invention is improved and the alignment error is about 0.2 μm. In addition, since the machining precision of the lens 210 and the lens 220 is improved, the alignment precision of the lens 210 and the lens 220 are also improved.

Further, in the lens system of the present invention, the assembly of the lens 210 and the lens 220 is performed by lodging. It is noted that, not only two lenses of the present invention may be assembled by lodging, a plurality of lens may also be assembled by lodging. Therefore, the alignment precision of the assembly of the lenses may be improved.

In addition, in comparison with the conventional technology, the optical lens of the present invention is assembled by lodging of the protrusion and the recess. Therefore, not only the optical property but also the assembly efficiency is enhanced.

The foregoing description of the preferred embodiment of the present invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

The invention claimed is:

1. An optical lens, comprising:
   a barrel comprising a light incidence opening and a receiving space, wherein the receiving space is connected with the light incidence opening;
   a first lens, disposed in the receiving space, wherein the first lens comprises a first outer loop and at least one protrusion, wherein the protrusion is disposed on the first outer loop, and a portion of the first lens is exposed by the light incidence opening;
   a second lens, disposed in the receiving space and lodged to the first lens, wherein the second lens comprises a second outer loop and at least one recess, wherein the recess is disposed on the second outer loop, the first outer loop is leant on the second outer loop, and the protrusion is lodged to the recess; and
   a baffle, disposed between the first lens and the second lens.

2. The optical lens of claim 1, wherein the protrusion comprises a hemispheric protrusion, the recess comprises a hemispheric recess, and the hemispheric protrusion is lodged to the hemispheric recess.

3. The optical lens of claim 1, wherein the protrusion comprises an annular protrusion, the recess comprises an annular recess, and the annular protrusion is lodged to the annular recess.

4. The optical lens of claim 1, further comprising;
   a mount, disposed in the receiving space and leant on the second lens, wherein the mount has a light exit opening for exposing a portion of the second lens.

5. The optical lens of claim 4, further comprising:
   an image capture component, disposed on a light path after the mount.

6. The optical lens of claim 5, further comprising:
   a filter, disposed on a light path between the mount and the image capture component.

7. A lens system, comprising:
   a first lens comprising a first outer loop and at least one protrusion, wherein the protrusion is disposed on the first outer loop;
   a second lens, lodged to the first lens, wherein the second lens comprises a second outer loop and at least one recess, wherein the recess is disposed on the second outer loop, the first outer loop is leant on the second outer loop, and the protrusion is lodged to the recess; and
   a baffle, disposed between the first lens and the second lens.

8. The lens system of claim 7, wherein the protrusion comprises a hemispheric protrusion, the recess comprises a hemispheric recess, and the hemispheric protrusion is lodged to the hemispheric recess.

9. The lens system of claim 7, wherein the protrusion comprises an annular protrusion, the recess comprises an annular recess, and the annular protrusion is lodged to the annular recess.

10. The lens system of claim 7, further comprising a mount disposed in the receiving space and leant on the second lens, wherein the mount has a light exit opening for exposing a portion of the second lens.

11. The lens system of claim 10, further comprising an image capture component disposed on a light path after the mount.

12. The lens system of claim 11, further comprising a filter disposed on a light path between the mount and the image capture component.

13. A lens system, comprising:
   a first lens comprising a first outer loop and at least one protrusion disposed on the first outer loop;
   a second lens, lodged to the first lens, wherein the second lens comprises a second outer loop and at least one recess disposed on the second outer loop, the first outer loop is leant on the second outer loop, and the protrusion disposed on the first outer loop of the first lens is lodged to the recess disposed on the second outer loop of the second lens such that optical axes of the first and second lenses substantially coincide with each other; and
   a baffle, disposed between the first lens and the second lens.

14. The lens system of claim 13, wherein the protrusion comprises a hemispheric protrusion, the recess comprises a hemispheric recess, and the hemispheric protrusion is lodged to the hemispheric recess.

15. The lens system of claim 13, wherein the protrusion comprises an annular protrusion, the recess comprises an annular recess, and the annular protrusion is lodged to the annular recess.

16. The lens system of claim 13, further comprising a mount disposed in the receiving space and leant on the second lens, wherein the mount has a light exit opening for exposing a portion of the second lens.

17. The lens system of claim 16, further comprising an image capture component disposed on a light path after the mount.

18. The lens system of claim 17, further comprising a filter disposed on a light path between the mount and the image capture component.

* * * * *